J. O. WADDELL.
FAUCET.

No. 180,968.　　　　　　　Patented Aug. 8, 1876.

Witnesses:　　　　　　　　Inventor:
W. M. Gooding　　　　　　James O. Waddell
Edward Colleen

N. PETERS, PHOTO-LITHOGRAPHER, WASHINGTON, D. C.

UNITED STATES PATENT OFFICE.

JAMES O. WADDELL, OF NEWARK, NEW JERSEY.

IMPROVEMENT IN FAUCETS.

Specification forming part of Letters Patent No. 180,968, dated August 8, 1876; application filed December 13, 1875.

*To all whom it may concern:*

Be it known that I, JAMES O. WADDELL, of the city of Newark, county of Essex, and State of New Jersey, have invented a new and useful Improvement in Stop-Valves in Faucets, which improvement is fully set forth in the following specification, reference being had to the accompanying drawings.

The object of the improvement is a valve that, by and in being used, shall always be tight, its closing inducing a snug fitting of the valve to the seat.

To attain this object the valve is made fast to the screw-spindle of the faucet to insure its turning with the spindle. The valve is made with a shell of hard metal, leaving therein a recess or cup around the spindle for the reception of soft metal, which is prevented from turning in the recess or cup in the valve, so that when it is drawn up to the seat by the screw the soft metal is rubbed to a tight joint by the friction on the seat, the soft metal at the same time being pressed tight in the recess or cup on the spindle.

Figure 1:
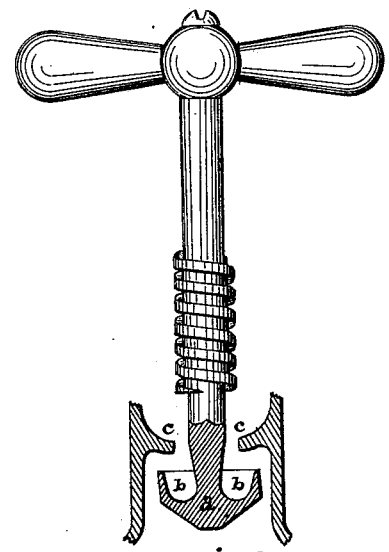
Figure 2:
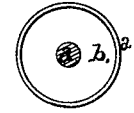

In the drawing, Figure 1 is a spindle, with a cup or recess shown in section. Fig. 2 is a top view of the same.

$a$ is the hard metal. $b$ is the soft in the recess or cup, and $c$ the valve-seat.

What I claim as my improvement is—

A valve having a recess around the spindle, provided with soft metal, when valve and spindle are constructed of one continuous piece of metal, as and for the purpose set forth.

JAMES O. WADDELL.

Attest:
    W. M. GOODING,
    EDWARD COLLVER.